Jan. 2, 1934.                G. A. ALVISET                1,942,232
                    COMBINATION CONTROL AND GATE VALVE
                           Filed Aug. 15, 1930
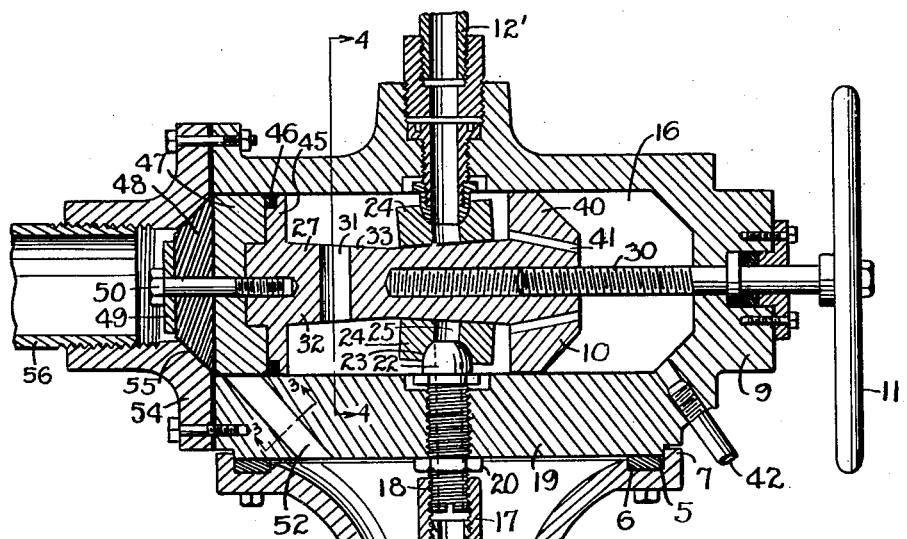
Fig. 1.
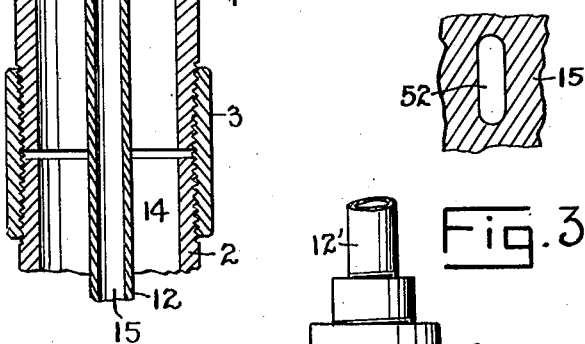
Fig. 3.
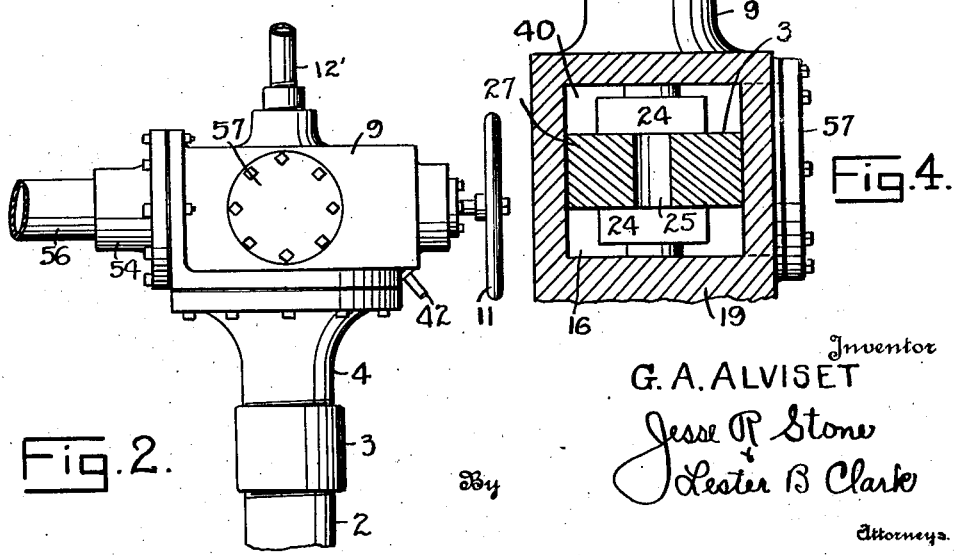
Fig. 2.
Fig. 4.
Inventor
G. A. ALVISET
By Jesse P. Stone
   Lester B. Clark
   Attorneys Patented Jan. 2, 1934

1,942,232

UNITED STATES PATENT OFFICE 1,942,232

COMBINATION CONTROL AND GATE VALVE

Gustave A. Alviset, Houston, Tex.

Application August 15, 1930. Serial No. 475,472

5 Claims. (Cl. 166—15)

The invention relates to an improvement in control heads which are particularly adapted for use in connection with oil well production and is of advantage in preventing the blow-out of the well and also in conserving both the gas and oil which flows from the well.

Various types of control heads have been devised heretofore with the idea of completely closing off the flow of both gas and oil from the well when desired. The majority of these mechanisms, however, embodied two or more valves which necessarily had to be operated in order to close off the well. However, inasmuch as the operation of these control heads is primarily for the purpose of preventing a blow-out of the well when a gas or oil pressure occurs their operation should be simplified as much as possible. Where a control head is provided which requires the operation of more than one valve it complicates matters considerably as in event the control head is to be closed as quickly as possible the operation of more than one valve delays such closing and materially increases the hazard in connection with the well. In wells where the oil is being produced it is usual to have a tubing extended from the casing through which the oil is to flow and when the blow-out preventer is to be closed this tubing of necessity causes considerable inconvenience and it is with the object in mind of providing a simple and economical structure which may be readily closed by the operation of a single mechanism that I have provided the present invention.

One of the objects of the invention is to practice a simplified method of operation in closing the flow of fluid thru double concentric strings of pipe.

It is one of the objects of the invention to devise a combined control head and blow-out preventer which will close off both the oil and gas flow by the operation of a single mechanism.

Another object of the invention is to provide a control head wherein a single gate member will serve to cut off the flow of oil as well as the flow of gas.

Still another object of the invention is to devise a control head wherein the gate portion serves as a section of the tubing and permits a flow of oil or gas therethrough.

Still another object of the invention is to provide a control head having a gate which carries a valve member to operate as a closure for the flow line which extends from such control head.

It is also an object of the invention to arrange contact members in connection with each of the pieces of tubing so that a complete seal will be maintained by the valve and the tubing.

It is also intended to arrange a gate member which will permit the escape of oil or gas thereby and permit the contact members on the tubing to be cleaned.

It seems apparent that various other objects of the invention will be readily understood by those skilled in the art when the following description is considered in connection with the accompanying drawing wherein:

Fig. 1 is a central vertical section of a control head embodying the invention and showing the parts in position when the valve is in closed position to cut off both the flow of oil and of gas.

Fig. 2 is a side elevation of the control head and showing a hand hole whereby access to the interior of the head may be obtained.

Figs. 3 and 4 are sectional views taken on the lines 3—3 and 4—4 respectively of Fig. 1.

The sectional view of Fig. 1 most clearly illustrates the invention and the numeral 2 indicates the upper end of the usual string of casing which is provided in order to anchor different portions of the well drilling equipment and other structure to the surface. This casing is provided with a coupling 3 and when it is desired to attach the present invention the swaged section 4 will be connected to the coupling 3 as illustrated. This member 4 is preferably provided with a groove 5 which receives the packing 6 which is in turn held in position by the flange 7. The member 4 is preferably circular and is adapted to receive the control head housing 9 thereon. This housing may be of any desired configuration and is arranged to receive the sliding gate member 10 which is operated by means of the handle 11.

In the usual equipment on wells the tubing 12 is provided and extends upwardly through the casing and at some point above the surface suitable valve and flow lines are connected to both the casing and the tubing 12 in a manner which is well understood. However, when it becomes necessary to close off the area 14 which is the annular space between the casing and the tubing and at the same time close off the passage 15 through the string of tubing, it is necessary to manipulate several valves and in a great many instances it is necessary to remove the tubing, the casing head, and, in some instances, various other types of equipment which may have been connected to the well.

With the present invention it is intended to place the control head in such a position that removal of any of the apparatus on top of the well or separation or removal of the tubing 12 is unnecessary, but in order to accomplish this a gate member is provided which will permit a flow of both gas and oil from the well and at the same time remain in ready position to close off the flow if desired. The tubing 12 is shown as continued above the control head and indicated by the reference character 12'. The gate 10 constitutes a connecting member for the two pieces of tubing 12 and 12'.

The housing 9 is provided with a cavity 16 which receives the gate member 10 so that it may slide horizontally. This gate member 10 is of a special construction in order to accomplish the purposes in view, which constitute merely the idea of closing off the flow of both oil and gas. When the gate 10 assumes the position shown in Fig. 1 the passage 15 is entirely closed. This is due to the fact that the tubing 12 is connected with the coupling 17 which is in turn connected with the threaded sleeve 18 which passes through the lower edge 19 of the housing 9. This sleeve is provided with a lock nut 20 so that its position with respect to the lower portion 19 of the housing can be adjusted. This sleeve 18 is provided on its interior end with a ball portion 22 which is adapted to fit in the socket 23 in the block 24.

In other words, the block 24 has a ball and socket connection with the sleeve 18 so that the block has a more or less limited pivotal movement with respect to the sleeve. The block 24 has a passage 25 therethrough which is adapted to align with the passage 15 in the tubing 12. Each of the blocks 24 has a smooth surface on the side opposed to the ball and socket connection which smooth surface is adapted to contact with the body 27 of the gate member 10. It seems obvious that by an adjustment of the nuts 20 that the ball 22 and block 24 may be readily adjusted to have the desired pressure against the flat surface of the body portion 27. In event wear occurs on the body 27 or on the blocks 24, re-adjustment of the nuts 20 can be readily accomplished so that the sleeve 18 will be moved inwardly in the desired direction. The ball and socket connection between the sleeve and the block permits the block to tilt slightly in following the incline face of the body 27 so that an aligning connection is maintained between the two pieces of tubing and the gate 10 at all times. When it is desired to open the passage 15 through the tubing it is only necessary to rotate the handle 11 so that the threads 30 moving in the body 10 of the gate will withdraw the same so that the passage 31 comes into alignment with the passage 15 through the tubing, whereupon the oil may flow from the well.

The faces 32 and 33 on the body 27 are inclined from the meeting point so that the body 27 increases in thickness.

With this construction, when the gate slides horizontally the blocks 24 will tilt slightly to follow the incline surface and will thus adjust themselves and grind a tight fitting seat upon the faces. It is intended that the blocks 24 will be made of brass or some similar metal, whereas the gate 27 will be made of steel. The ball portions 22 will also be made of steel so that a tight connection will be had at all times between these moving parts. The apex of the incline faces 33 allows a slight leakage of oil to occur as the gate is moved to either opened or closed position. This leakage will be sufficient to clean the surface and remove any portions of abrasive which may have lodged therein and thus permit a better seating of the blocks upon the face.

The gate 10 is provided with a head 40 which is adapted to close the chamber 16 and prevent the entrance of extraneous materials. Passages 41 are provided, however, to permit equalizing of the pressure on opposite sides of the head 40 and a discharge pipe 42 is provided to permit drainage of the chamber 16.

The end of the gate 10 which is opposite the head 40 is arranged to seal the chamber 16 against the entrance of extraneous materials and is provided with a flange 45 which supports a sealing ring 46 which will seal the chamber. A head 47 is carried by the flange 46 and is adapted to support a packing ring 48 which is in turn supported by a washer 49 and a bolt 50. The lower partition 19 of the control head is formed with an opening 52 which is adapted to connect with the annular space 14 between the casing and the tubing below the control head. The head 47 is arranged to slide across the upper end of this passage 52 and crosses the same when the gate is moved to the left to close the passage 15 in the tubing.

The cap 54 is arranged to close the end of the body portion 9 of the control head and this cap is formed with a beveled seat 55 which is adapted to receive the packing ring 48. A flow line 56 is connected with this cap 54. The sealing ring 46 serves to prevent the entrance of gas from the passage 52 into the chamber 16.

From the foregoing description it seems apparent that the operation of the control head is very simple as it is only necessary to manipulate the handle 11 in order to advance or retract the gate member 10. When the gate is in the position shown in Fig. 1 the passage 52 will be closed by the head 47 and sealed by the ring 48 as well as the ring 46 so that the area 14 will be completely closed off and no escape of gas or oil therefrom will occur. At the same time the passage 15 through the tubing 12 will be sealed by the metal to metal contact of the block 24 against the incline face 32 of the gate body 27. When it is desired to open the control head the wheel 11 may be rotated so that the gate 10 is drawn to the right as viewed in Fig. 1. This will move the passage 31 into alignment with the passage 15 through the tubing and at the same time will retract the head 47 and the ring 48 so that the passage 52 will be open for communication with the flow line 56. When in this position the oil and gas may flow from the well as desired.

In order that access may be had to the interior of the housing 9 for adjustment of the mechanisms therein I have provided a cover plate 57 which may be removed and uncover the hand hold in order to make such adjustment. Fig. 4 shows the sectional view of the gate member and the blocks 24 as well as the chamber 16. The showing of Fig. 3 illustrates one configuration which the passage 52 may assume.

The control head has been designated as a two in one mechanism as it is available to close off the area through the tubing as well as the area outside the tubing and within the casing. These two operations are both accomplished by the manipulation of one handle so that the speed with which the entire well may be closed has been materially increased. The opportunity for a blow-out or material leakage of the oil or gas while the various valves heretofore in use are being closed has been practically eliminated due to the fact that the closure is all accomplished at one time, and that an improved and simplified method has been employed. It is to be understood that the invention may take on various modifications and changes in configuration other than illustrated in the drawing without departing from the invention as set forth in the appended claims.

What I claim as new is:

1. A control head of the character described having tubing extending therefrom both upwardly and downwardly, a flow line connected therewith, a single gate member arranged for movement to close both strings of tubing and said flow line, and adjustable means on each of the strings of tubing to form a seal with said gate.

2. A control head of the character described having tubing extending therefrom both upwardly and downwardly, a flow line connected therewith, a single gate member arranged for movement to close both strings of tubing and said flow line, adjustable means on each of the strings of tubing to form a seal with said gate, and additional means to form a seal for said flow line.

3. A control head including a body, a chamber therein, upward and downward strings of tubing connected to said body and in communication with said chamber, a single closure means arranged to cut off such communication, and ball and socket means connected to said tubing strings to engage said closure means and form a seal therewith.

4. In a control head a housing, a well casing, and a well tubing connected to said housing, a single valve means in said housing to close off the flow of fluid from the well casing and the flow of fluid from the well tubing, said valve means forming part of the tubing when opened and sealing the tube when closed.

5. A control head including a housing, connections thereon for well tubing, a chamber in said housing, a gate member in said chamber, sealing members in said chamber in engagement with said gate member, said members being disposed on said connections, and means to lock said connections to said housing.

GUSTAVE A. ALVISET.